(12) United States Patent
Russell

(10) Patent No.: US 9,823,962 B2
(45) Date of Patent: Nov. 21, 2017

(54) SOFT ERROR DETECTION IN A MEMORY SYSTEM

(71) Applicant: FREESCALE SEMICONDUCTOR, INC., Austin, TX (US)

(72) Inventor: Andrew C. Russell, Austin, TX (US)

(73) Assignee: NXP USA, Inc., Austin, TX (US)

( * ) Notice: Subject to any disclaimer, the term of this patent is extended or adjusted under 35 U.S.C. 154(b) by 147 days.

(21) Appl. No.: 14/693,788

(22) Filed: Apr. 22, 2015

(65) Prior Publication Data

US 2016/0314038 A1  Oct. 27, 2016

(51) Int. Cl.
*G06F 11/00* (2006.01)
*G06F 11/10* (2006.01)

(52) U.S. Cl.
CPC .................................. *G06F 11/106* (2013.01)

(58) Field of Classification Search
CPC .......................... G06F 11/1076; G06F 11/1004
See application file for complete search history.

(56) References Cited

U.S. PATENT DOCUMENTS

| | | | |
|---|---|---|---|
| 4,725,899 A * | 2/1988 | Gardner | G11B 20/182 360/15 |
| 5,303,190 A | 4/1994 | Pelley, III | |
| 6,766,431 B1 | 7/2004 | Moyer | |
| 6,772,383 B1 | 8/2004 | Quach et al. | |
| 7,012,835 B2 | 3/2006 | Gonzalez et al. | |
| 7,100,004 B2 | 8/2006 | Johnson et al. | |
| 7,434,012 B1 | 10/2008 | Ives et al. | |
| 7,437,597 B1 | 10/2008 | Kruckemyer et al. | |
| 7,564,093 B2 | 7/2009 | Matsuda | |
| 7,573,773 B2 | 8/2009 | Lin | |
| 7,606,980 B2 | 10/2009 | Qureshi et al. | |
| 7,716,428 B2 | 5/2010 | Guthrie et al. | |
| 7,882,323 B2 | 2/2011 | Allison et al. | |
| 7,900,100 B2 | 3/2011 | Gollub | |
| 8,024,638 B2 | 9/2011 | Resnick et al. | |
| 8,255,772 B1 | 8/2012 | Foley | |
| 2003/0191888 A1 | 10/2003 | Klein | |
| 2004/0199830 A1 | 10/2004 | Gilbert et al. | |
| 2004/0243886 A1 | 12/2004 | Klein | |
| 2005/0073884 A1* | 4/2005 | Gonzalez | G06F 11/106 365/185.02 |
| 2005/0240801 A1 | 10/2005 | Johnson et al. | |
| 2007/0011513 A1 | 1/2007 | Biswas et al. | |
| 2008/0109691 A1 | 5/2008 | Dieffenderfer et al. | |
| 2009/0144503 A1 | 6/2009 | Faucher et al. | |

(Continued)

OTHER PUBLICATIONS

IBM Techdocs FAQ: Power 6 Frequently Asked Question, "What is Hardware Assisted Memory Scrubbing and how is it used?", printed Jul. 13, 2012.

(Continued)

*Primary Examiner* — Guy Lamarre

(57) ABSTRACT

In a memory having a memory array, a method includes reading read data from the memory array, and detecting a first bit error in the read data. The method further includes checking all bitcells in a radial search region about the first bit error. The radial search region is defined by a search radius which indicates a number of concentric rings of bitcells physically surrounding the first bit error in the memory array.

20 Claims, 4 Drawing Sheets

(56) References Cited

U.S. PATENT DOCUMENTS

| | | | | |
|---|---|---|---|---|
| 2010/0070835 | A1* | 3/2010 | Song | G11B 20/10009 714/795 |
| 2010/0176841 | A1 | 7/2010 | Jang et al. | |
| 2010/0191990 | A1 | 7/2010 | Zhang et al. | |
| 2010/0332900 | A1* | 12/2010 | Yang | G06F 11/106 714/16 |
| 2011/0029807 | A1 | 2/2011 | Fry et al. | |
| 2011/0066768 | A1* | 3/2011 | Brittner | H04L 1/0001 710/18 |
| 2014/0052931 | A1 | 2/2014 | Ramaraju et al. | |

OTHER PUBLICATIONS

Wikipedia.org, "Error detection and correction, Error-correcting code," printed Jul. 13, 2012.

Wikipedia.org, "Memory scrubbing," printed Jul. 13, 2012.

R. Naseer et al., "The DF-Dice Storage Element for Immunity to Soft Errors," 48th Midwest Symposium on Circuits and Systems, Aug. 7-10, 2005 pp. 303-306.

S. Jahinuzzaman et al., "A Soft Tolerant 10T SRAM Bit-Cell With Differential Read Capability," IEEE Transactions on Nuclear Science, vol. 56, No. 6, Dec. 2009.

Tezzaron Semiconductor, "Soft Errors in Electronic Memory—A White Paper," Version 1.1, Jan. 5, 2004.

J. Barth et al., "A 45nm SOI Embedded DRAM Macro for POWER7(TM) 530319032MB On-Chip L3 Cache," IEEE International Solid-State Circuits Conference, Session 19, High-Performance Embedded Memory 19.1, 2010.

K. Flautner et al., "Drowsy Caches: Simple Techniques for Reducing Leakage Power," 29th Annual International Symposium on Computer Architecture, 2002.

F. Ootsuka et al., "A Novel 0.25 Full CMOS SRAM Cell Using Stacked Cross Couple with Enhances Soft Error Immunity," Proc. Int. Electron Devices Meeting, 1998, pp. 205-208.

Notice of Allowance dated Mar. 18, 2015 for U.S. Appl. No. 13/588,243, 5 pages.

Non-Final Office Action dated Aug. 15, 2014 for U.S. Appl. No. 13/588,243, 10 pages.

\* cited by examiner

| ROW ADDR | | | COL ADDR | |
|---|---|---|---|---|
| 0 | 1 | 2 | 4 | 5 |
| 1 | 0 | 0 | 0 | 1 |
| 0 | 0 | 0 | 1 | 0 |
| 1 | 0 | 0 | 1 | 1 |
| 0 | 1 | 1 | 0 | 1 |
| 0 | 1 | 1 | 1 | 1 |
| 0 | 1 | 0 | 0 | 1 |
| 0 | 0 | 1 | 1 | 1 |
| 0 | 0 | 0 | 0 | 1 |

SOFT ERROR DETECTION IN A MEMORY SYSTEM

BACKGROUND

Field

This disclosure relates generally to memory systems, and more specifically, to soft error detection in a memory system.

Related Art

Radiation from charged particles, like alpha particles, can change the logic state of a memory cell. When a memory line or cache line is read and a soft error is detected, error correction code (ECC) can be used to correct the error and write the corrected data back to the memory. Typically, ECC is used to correct single bit errors. However, due to the path of the charged particle through silicon, soft errors are likely to be found in the vicinity of other soft errors. Therefore, the particle that caused the detected soft error may also have flipped other bits belonging to other memory lines in nearby areas. If soft errors are not adequately corrected, they can accumulate to a point in which they are not correctable by ECC. In some memory systems available today, full memory scrubbing operations are performed periodically to correct soft errors. However, full memory scrubbing, in which the full memory array is checked for soft errors, cannot be performed often enough to prevent multi-bit errors which are not correctable by ECC from accumulating. Therefore, a need exists for a soft error detection scheme which prevents occurrence of errors which are not correctable by ECC without having to increase the frequency of full memory scrubs.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 3-5 illustrate, in diagrammatic form, a portion of a memory array of the memory system of FIG. 1, in accordance with various examples of the present invention.

FIG. 6 illustrates, in diagrammatic form, an addressing scheme in accordance with an embodiment of the present invention.

DETAILED DESCRIPTION

Due to the path of the charged particle through silicon, soft errors are likely to be found in the vicinity of other soft errors. When a bit error (i.e. flipped bit) due to a soft error is detected, such as through the use of ECC, bitcells within a radial search region about the detected bit error are searched for additional bit errors. The radial search region is defined by a search radius which indicates a number of concentric rings of bit locations physically surrounding the bit error (i.e. the flipped bit). If additional flipped bits are found within the radial search region defined by the search radius, bitcells within a radial search region around each additional flipped bit is searched for flipped bits. This process can be performed iteratively until no additional flipped bits are found. In this manner, a trail of flipped bits caused by a charged particle can be effectively corrected regardless of which bit in the trail is first detected. In one embodiment, after the iterative process, the search radius can be recalculated based on the bit distance of the furthest bit error from the initial detected bit error. Furthermore, the frequency of full memory scrubbing operations may be reduced or, alternatively, full memory scrubbing operations may not be performed at all.

Figure 1:
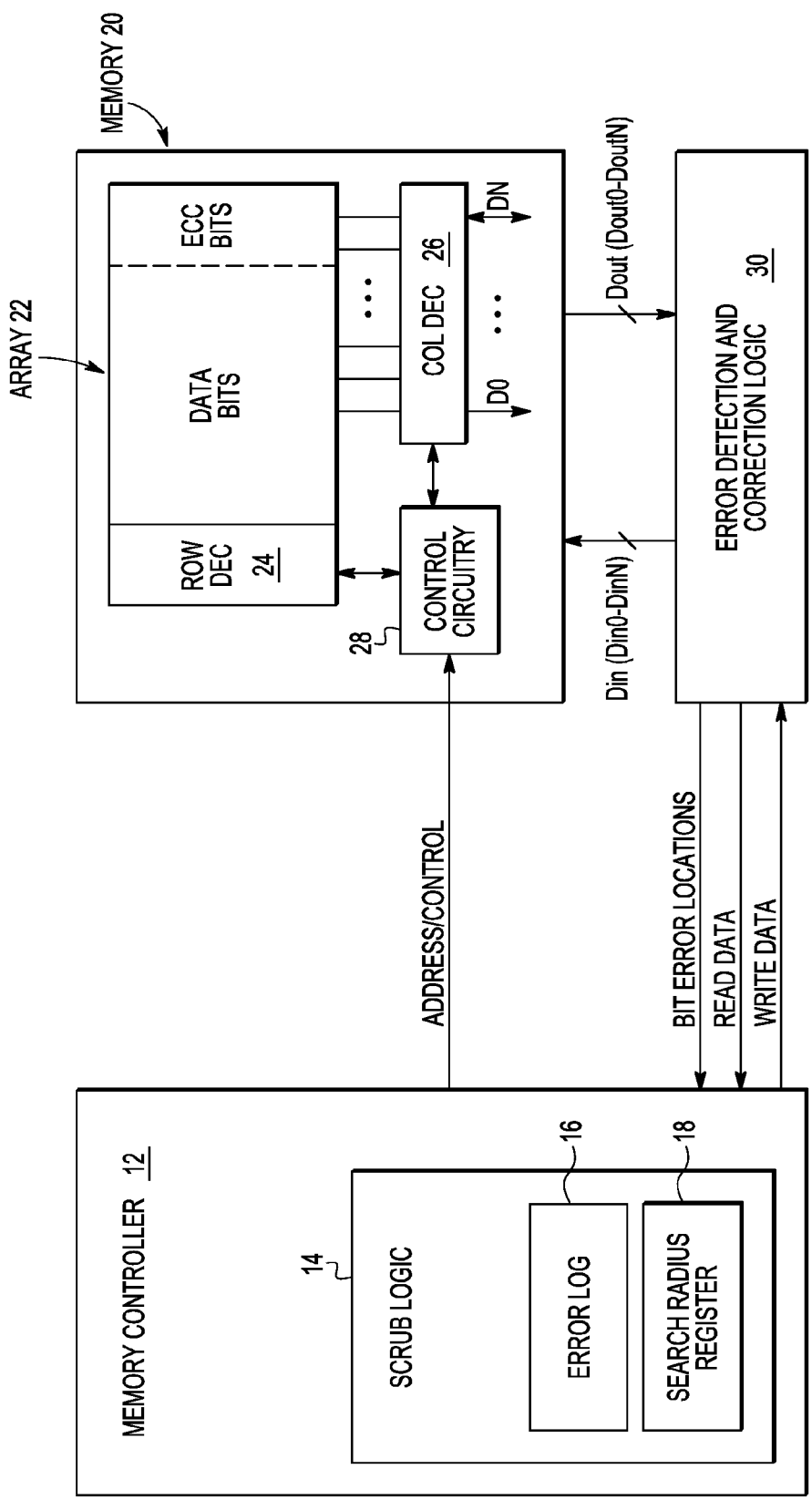
FIG. 1 illustrates, in block diagram form, a memory system in accordance with one embodiment of the present invention.

FIG. 1 illustrates a memory system 10 in accordance with one embodiment of the present invention. Memory system 10 includes a memory controller 12, a memory 20, and error detection and correction logic 30. Memory controller 12 includes scrub logic 14 which includes an error log 16 and a search radius register 18. Memory controller 12 provides address/control information to memory 20, memory 20 provides output data, Dout, which includes N+1 bits (Dout0-DoutN) to error detection and correction logic 30 and receives input data, Din0-DinN, from error detection and correction logic 30. Error detection and correction logic 30 provides bit error locations to memory controller 12. Memory controller 12 also provides write data to error detection and correction logic 30 and receives read data from error detection and correction logic 30. Memory 20 includes an array 22 of bitcells including a portion which stores data bits and a portion which stores ECC bits. In one embodiment, each row of bitcells in array 22 has data bits and ECC bits which correspond to the data bits. Memory 20 includes row decoder 24 coupled to array 22 and column decoder 26 coupled to array 22. Column decoder 26 couples addressed bitlines of array 22 to Din to receive write data for a write operation and couples addressed bitlines of array 22 to Dout to provide read data for a read operation. Control circuitry 28 receives address and control information from memory controller 12 and is coupled to row decoder 24 and column decoder 26.

In operation, an access address and control information, corresponding to either a write operation or a read operation, is provided to control circuitry 28 of memory 20. Control circuitry 28 provides the appropriate portion of the access address to row decoder 24 to turn on the selected wordlines and provides the appropriate portion of the access address to column decoder 26 to select the appropriate bitlines. The bitcells at the intersection of each selected word line and selected bitline store write data and corresponding ECC bits for a write operation or provide read data and corresponding ECC bits for a read operation.

For a write operation, the write data is provided by memory controller 12 to error detection and correction logic 30 which determines ECC bits for the write data. The write data and the ECC bits are provided to memory 20 as Din0-DinN in which a first portion of the N+1 bits is the write data and a remaining portion of the N+1 bits is the ECC value. Din0-DinN is provided as D0-DN to column decoder 26. Column decoder 26 couples the D0-DN lines to the selected bitlines in accordance with the decoded write address. In this manner, the values of D0-DN are stored into the selected bitcells. Note that the first portion of the N+1 bits are provided to the selected bitlines of the data portion of array 22 and the remaining portion of the N+1 bits are provided to the selected bitlines of the ECC portion of array 22.

For a read operation, the selected bitlines are sensed and the read data from the selected bitcells are provided on D0 to DN as Dout0-DoutN to error detection and correction logic 30. Error detection and correction logic 30 uses the ECC bits received as part of Dout from the ECC portion of array 22 and performs error detection and correction on the data bits received as part of Dout from the data portion of array 22. If no error is detected, error detection and correction logic 30 outputs the read data to memory controller 12. If a bit error is detected which can be corrected, error detection and correction logic 30 corrects the data and provides the corrected data as the read data to memory controller 12 and also provides the location of the bit error to memory controller 12. Note that error detection and correction logic 30 may use any type of ECC scheme to detect, and if possible, correct errors. In one embodiment, the ECC scheme used to detect errors is capable of detecting and correcting a single bit error. This ECC scheme is also capable of detecting multiple bit errors, but cannot correct a multiple bit error. In this case, the detected error is not corrected, and an uncorrectable error can be signaled to memory controller 12.

Figure 2:
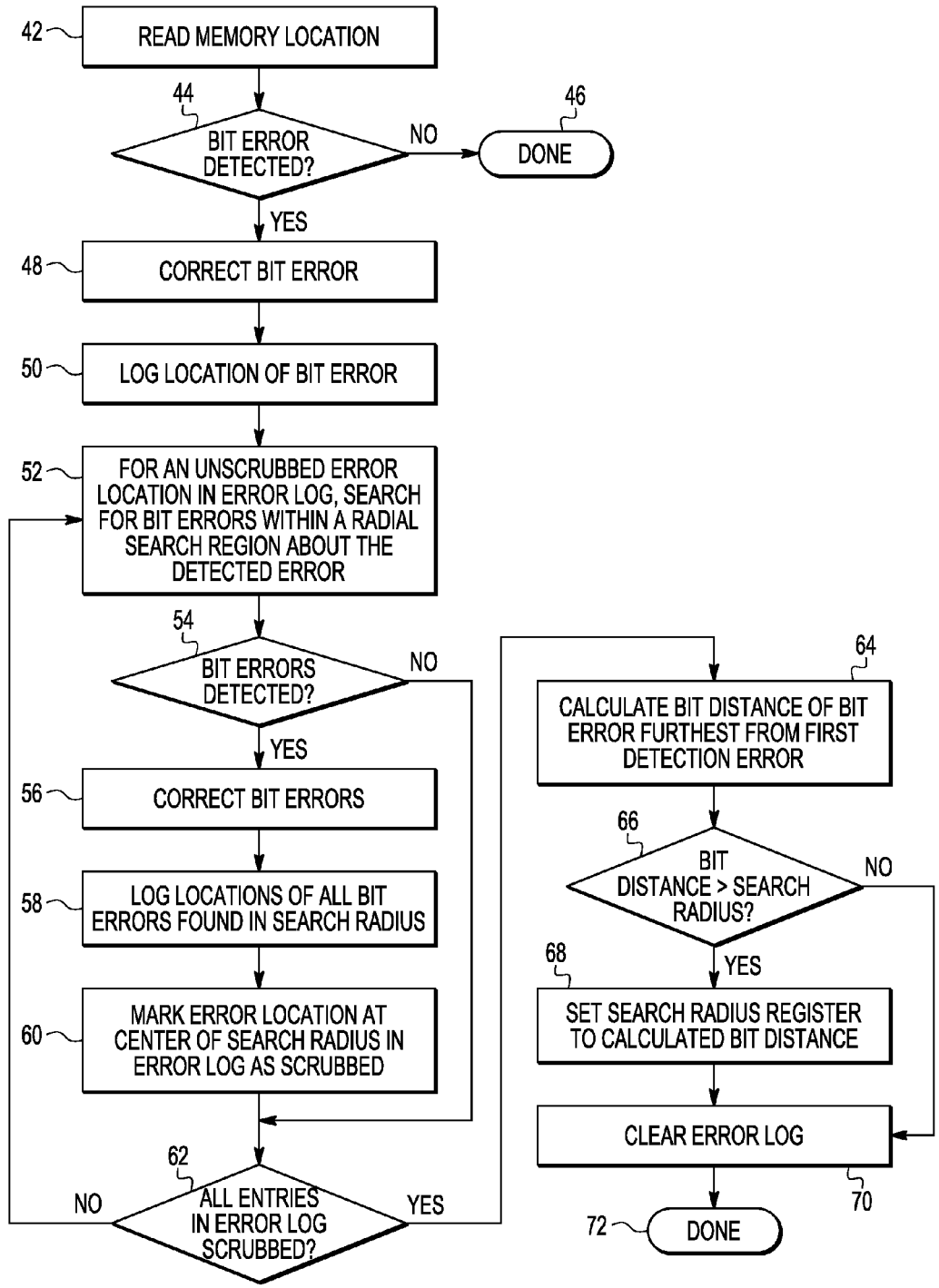
FIG. 2 illustrates, in flow diagram form, a method of soft error detection and correction within the memory system of FIG. 1, in accordance with one embodiment of the present invention.
Figures 3, 4:
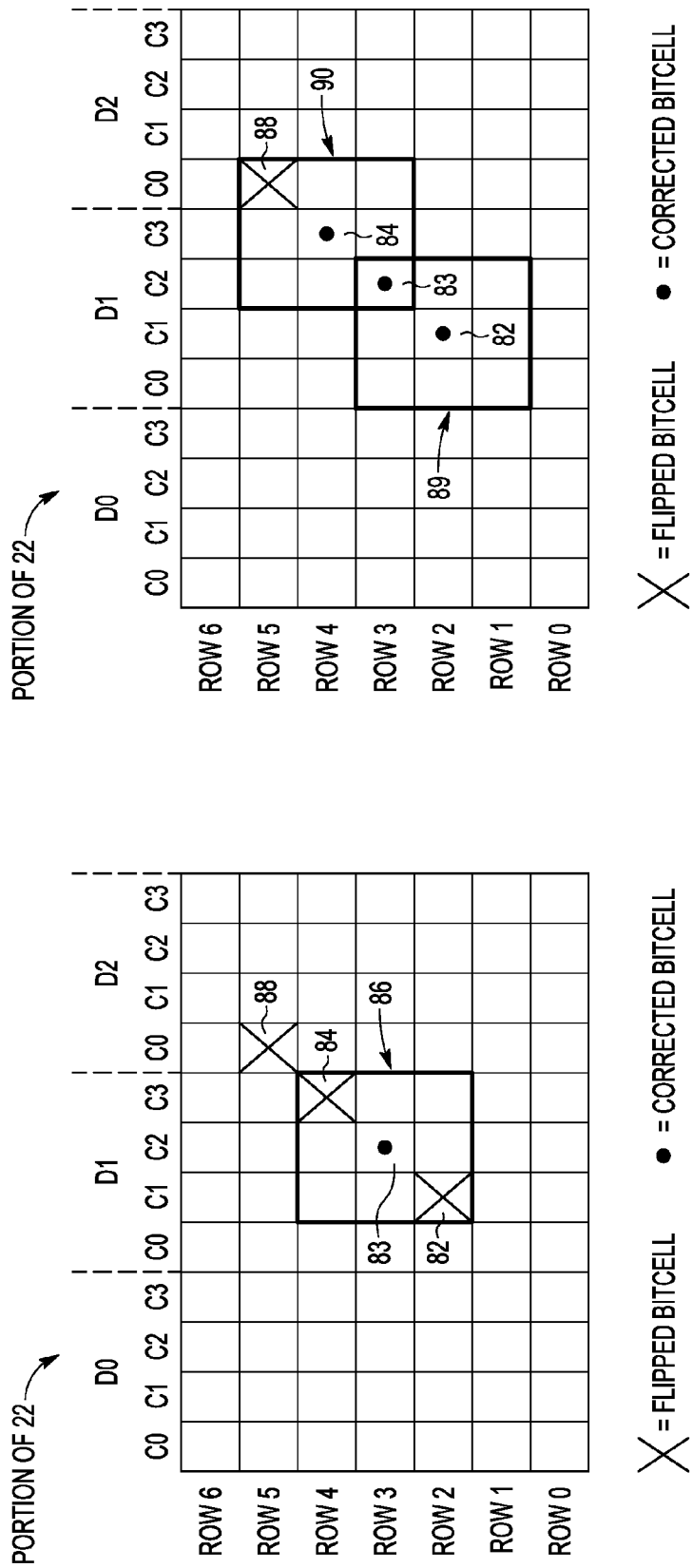

In the case in which a bit error (i.e. a flipped bit) was detected and corrected by error detection and correction logic 30, scrub logic 14 stores the bit error location in error log 16. Scrub logic 14 also includes a search radius register which stores a search radius. In response to a bit error, memory controller 12 searches a radial search region defined by the search radius. The search radius indicates a number of concentric rings of bit locations physically surrounding the bit error (i.e. the flipped bit). Memory controller 12 generates the appropriate access addresses to search the radial search region around the bit error to determine if any additional bit errors are found. If additional bit errors are found within the radial search region defined by the search radius by error detection and correction logic 30, they are logged by scrub logic 14 into error log 16, and memory controller 12 searches a radial search region around each additional bit error. This process can be performed iteratively until no additional bit error is found. Furthermore, after this iterative process, scrub logic 14 can recalculate the search radius based on the bit distance of the furthest bit error from the initial detected bit error and store this recalculated search radius into search radius register 18. The searching of errors within a radial search region defined by a search radius will be described in further detail below in reference to FIGS. 2-6. FIG. 2 illustrates in flow diagram form, a method 40 for soft error detection and correction which may be performed by memory system 10. FIGS. 3-5 illustrate an example portion of array 22.

FIG. 3 illustrates an example of a portion of the data bit portion of array 22. The illustrated portion of array 22 includes 7 rows, row 0-row 6, and includes 12 columns which corresponding to 3 data bits, D0-D2. In array 22, each data bit corresponds to 4 columns, C0-C3. A bitcell is located at the intersection of each row and column. Based on the access address provided by memory controller 12, one of the four columns C0-C3 and one of the seven rows row 0-row 6, is selected to access the corresponding data bit. The value of a data bit (e.g. D0) can be stored in one of twenty-eight addressable bitcell locations. For example, the value of D0 stored in row 6 corresponds to the bit value stored in one of C0-C3 of D0 as determined by the access address. Control circuitry 28 provides a portion of the access address to column decoder 26, which decodes this portion of the address. Based on the decoding, column decoder 26 couples one of the 4 bitlines corresponding to one of the four columns C0-C3 to D0 which is coupled to receive Din0 for a write access or coupled to provide Dout0 for a read access. Note that these descriptions apply to every bit in array 22, including both the data bits and the ECC bits.

Method 40 of FIG. 2 begins with block 42 in which a memory location in array 22 is read. If no bit error is detected, such as by error detection and correction logic 30, method 40 ends at block 46. If a bit error is detected and is correctable, the bit error is corrected in block 48 by error detection and correction logic 30 and the corrected read data is provided to memory controller 12. Also, in block 50, the locations of any bit errors are logged. As described above, error detection and correction logic 30, upon detecting and correcting a bit error, the bit error location is provided to memory controller 12 so that scrub logic 14 may store the bit error location in error log 16.

Referring to FIG. 3, as an example for blocks 44-50 of method 40, memory controller 12 performs a read access to row 3 of array 22. In this example, bitcell 83 is a flipped bit in that bitcell 83 stores an opposite bit value than what should be stored. In response to the read access, the addressed contents at the intersection of column C2 and row 3, including D0, D1, and D2, as well as the corresponding ECC bits are provided as Dout0-DoutN to error detection and correction logic 30. As described above, D1 has four corresponding columns C0-C3. The accessed value of D1 is stored in bitcell 83, at the intersection of row 3 and C2. This results in an error in Dout0-DoutN provided to error detection and correction logic 30. Therefore, error detection and correction logic 30 detects and corrects the bit error, provides the corrected data as the read data to memory controller 12, and provides the bit location of bitcell 83 to scrub logic 14 which stores the bit location in error log 16.

Method 40 then proceeds to block 52 in which for any unscrubbed error location, a search for bit errors is performed within a radial search region about the detected error. As used herein, a scrubbed error location is a location in which a radial search region about the error location, as defined by a search radius, has been searched for errors, and an unscrubbed error location is a location in which the radial search region about the error location has not been searched for errors. The radial search region about the detected bit error is defined by a search radius which indicates a number of concentric rings of bit locations (i.e. bitcells) physically surrounding the bit error (i.e. the flipped bit). This search radius is stored in search radius register 18 of memory controller 12. Memory controller 12 generates memory addresses for the radial search region about the error location in accordance with the search radius, and provides read requests with these generated addresses to memory 20, and, in response, memory 20 provides the read data to error detection and correction logic 30.

Referring to FIG. 3, a search radius of one is used to define radial search region 58 about bitcell 83. The search radius of one indicates that the radial search region about bitcell 83 is one concentric ring of bit locations (i.e. bitcells) physically surrounding bitcell 83. Therefore, radial search region 58 includes the 8 bitcells which physically surround bitcell 83. These include the bitcells at the intersections of row 4 and each of columns C1, C2, and C3 which correspond to D1, at the intersection of row 3 and each of columns C1 and C3 which correspond to D1, and at the intersection of row 2 and each of columns C1, C2, and C3 which correspond to D1.

Note that bitcells outside of the radial search region need not be scrubbed. Furthermore, all the bitcells within the search region may not be consecutively addressed. For example, they may include noncontiguous addresses. FIG. 6 illustrates a set of row and column addresses which may be generated by memory controller 12 to access the bitcells in the radial search region to determine if a bit error exists. In the example of FIG. 6, 3 bits are provided to address a row of rows 0-6 and 2 bits are provided to address a column of C0-C3 for a particular data bit. Therefore, the first row address %100 and column address %01 addresses the bitcell at the intersection of row 4 and C1 corresponding to D1, which is the upper left bitcell of radial search region 86. The second row address %100 and column address %10 and the third row address %100 and column address %11 address the top middle and top right bitcells of radial search region 86. The fourth row address %011 and column address %01 address the bitcell at the intersection of row 3 and C1 corresponding to D1, which is the bitcell physically to the left of bitcell 83. The fifth through eighth rows address the remaining bitcells within radial search region 86. Note that the addresses of FIG. 6 which are used to address the bitcells of radial search region 86 (which may include more bits, as needed, to address the locations within array 22) are not consecutive addresses. Furthermore, note that radial search region 86 includes a ring of bitcells which physically surround bitcell 83. That is, the bitcells within radial search region 86 may or may not have adjacent addresses to each other, but are located such that the ring of bitcells physically surround bitcell 83.

In the example of FIG. 3, it is assumed that a bit error occurs in bitcell location 82 and bitcell location 84 within radial search region 86. Therefore, referring back to method 40 of FIG. 2, the flow proceeds to decision diamond 54 in which it is determined whether any bit errors are detected within the radial search region about the detected error in bitcell 83. If not, method 40 proceeds to decision diamond 62. If so, method 40 proceeds to block 56 in which the bit errors are corrected by error detection and correction logic 30 and stored back to their locations in array 22. In this manner, both bitcells 82 and 84 are corrected. Also, as in block 58, the bit locations of bitcells 82 and 84 are provided to scrub logic 14 to be stored in error log 16. Method 40 then proceeds to block 60 in which the error location at the center of the radial search region 86, corresponding to bitcell 83, is marked as scrubbed in error log 16.

Method 40 then proceeds to decision diamond 62 where it is determined whether all entries in log 16 have been scrubbed, i.e. checked for additional bit errors in a radial search region about the bit location indicated by the entry. If not, method 40 returns to block 52 in which, for each unscrubbed error location in the error log, a search for bit errors is performed within a radial search region about the unscrubbed error location. Therefore, as indicated in FIG. 3, each of bitcells 82 and 84 include a bit error, and therefore, each are scrubbed. As illustrated in FIG. 4, a radial search region 89 physically surrounding corrected bitcell 82 is searched for additional errors, and a radial search region 90 physically surrounding corrected bitcell 84 is searched for additional errors. In this example, it is assumed that no additional bit errors are found in radial search region 89, but another bit error is found within search region 90 in bitcell 88. The bit error in bitcell 88 will be corrected and logged in error log 16, such as in blocks 56 and 58, and the locations of bitcells 82 and 84 will be marked as scrubbed within error log 16 as in block 60. Method 40 will continue such that, as illustrated in FIG. 5, a radial search region 92 physically surrounding corrected bitcell 88 is searched for bit errors. In the current example, it is assumed that no bit errors are found in radial search region 92. Therefore, note that the search for bit errors is iteratively performed in a radial search region defined by the search radius about each detected bit error (e.g., by blocks 52, 54, 56, 58, 60, and 62) until no additional bit errors are found within the radial search regions. Since, in the example of FIGS. 4 and 5, no additional bit errors were found in search region 89 and search region 92, the iterative search for bit errors is complete and thus no entries in error log 16 remain unscrubbed.

At decision diamond 62 of FIG. 2, if all entries within error log 16 have been scrubbed, method 40 continues to block 64 in which a bit distance of a bit error furthest from the first detected bit error is calculated. The first detected bit error refers to the initial bit error location which was stored into log 16 after being initialized or cleared. The bit distance of a bit error from the first detected bit error refers to a number of concentric rings about the first detected bit error which is needed to reach the bit error. In the example of FIG. 5, the first or initial bit error detected corresponds to bitcell 83. Each of bitcells 82 and 84 are within one concentric ring around bitcell 83. However, bitcell 88 is within two concentric rings around bitcell 83. That is a first concentric ring that is immediately adjacent and around bitcell 83 does not include bitcell 88, however, a second concentric ring that is immediately adjacent and around the first concentric ring does. Therefore, the bit distance from bitcell 83 to bitcell 88 is 2, which is the bit distance of the bit error furthest from bitcell 83. Method 40 proceeds to decision diamond 66 in which it is determined if this bit distance is greater than the search radius. If so, then the search radius in search radius register 18 can be updated to this bit distance. In this manner, radial search regions around subsequently found bit errors will include more concentric rings about the bit error. If this bit distance is not greater than the search radius or after the search radius is updated in block 68, error log 16 is cleared in block 70 and method 40 ends at block 72.

By searching one or more concentric rings around a bitcell error when found, any nearby error in the path of the charged particle which may have caused the bitcell error may be found and corrected. In this manner, the need for increased scrubbing frequencies of large memory regions is reduced for preventing accumulation of bit errors. By performing iterative radial searches in response to detecting a bit error, as described above with method 40, bit errors can be detected and corrected before they remain present long enough to result in a double bit error within a cache line. For example, if bitcell 82, 84, or 88 were not corrected in response to the detection of the bit error in bitcell 83, they may not be fixed before another soft error occurs in the same region resulting in an uncorrectable double bit error within a cache line. Bitcells 82, 83, 84, and 88 are assumed to be in separate cache lines that are protected by their own sets of ECC bits. Multiple bit errors are correctable in memory so long as they occur in separate cache lines assuming an ECC scheme that can correct a single bit error and detect double bit errors. By performing iterative radial searches in response to the bit error of bitcell 88, bitcells 82, 84, and 88 are timely corrected. Therefore, soft errors within a particle's path can be more timely corrected.

In an alternate embodiment, only unsearched bitcell locations are checked within a bitcell search radius for the case of multiple overlapping search radii. For example, in FIG. 4, in bitcell search radius 89, the four bitcells at row 2 columns C1 and C2 and row 3 columns C1 and C2 may be excluded from being checked since they were already checked with bitcell search radius 86 in FIG. 3 so that redundant error checking is avoided. A search radius address log may be used to store the addresses of previously checked bitcells within a search radius for bitcell search radii after the first bitcell radius is searched so that only unchecked bitcell address are checked for errors. After the iterative scrubbing process is complete, the search radius address log would be cleared in block 70 of method 40.

Therefore, by now it can be appreciated how searching within a search region defined by a search radius results in improved error detection and correction. Furthermore, an iterative process may be used to ensure that a trail of flipped bits caused by a charged particle can be effectively corrected regardless of which bit in the trail is first detected. In this manner, the frequency of full memory scrubbing operations may be reduced or, alternatively, full memory scrubbing operations may not be performed at all.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The symbol "$" preceding a number indicates that the number is represented in its hexadecimal or base sixteen form. The symbol "%" or "0b" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 10 are circuitry located on a single integrated circuit or within a same device. Alternatively, system 10 may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, memory 20 may be implemented with different memory types and in different ways and still make use of the improved soft error detection techniques described herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, in a memory having a memory array, a method includes reading read data from the memory array; detecting a first bit error in the read data; and checking all bitcells in a radial search region about the first bit error, wherein the radial search region is defined by a search radius which indicates a number of concentric rings of bitcells physically surrounding the first bit error in the memory array. In one aspect of the above embodiment, the read data includes data bits and error correction bits, wherein the detecting the first bit error in the read data includes using the error correction bits of the read data to detect the first bit error in the data bits of the read data. In a further aspect, the method further includes correcting a bit location of the memory array containing the first bit error. In another further aspect, the reading the read data from the memory array is performed in response to a read request to the memory, and the method further includes after detecting the bit error, correcting the first bit error using the error correction bits prior to returning the read data in response to the read request. In another aspect of the above embodiment, for each additional bit error detected during the checking all bitcells in the radial search region about the first bit error, the method further includes checking all bitcells for bit errors in a radial search region around the additional bit error defined by the search radius. In a further aspect, for each additional bit error detected during the checking all bitcells in the radial search region about the error, the method further includes correcting the additional bit error in the memory array. In another further aspect, the method further includes iteratively checking all bitcells in a radial search region around each detected bit error until no additional bit error is detected in the radial search regions. In yet a further aspect, after the iteratively checking all bitcells, the method further includes identifying a bit error which is furthest in location from the first bit error; determining a number of concentric rings of bitcells physically surrounding the first bit error needed to reach the identified bit error; and selectively updating the search radius based on the number of concentric rings of bitcells physically surrounding the first bit error needed to reach the identified bit error. In yet a further aspect, when the number of concentric rings of bitcells physically surrounding the first bit error needed to reach the identified bit error is greater than the search radius, the method further includes updating the search radius to indicate the number of concentric rings of bitcells physically surrounding the first bit error needed to reach the identified bit error. In yet an even further aspect, when the number of concentric rings of bitcells physically surrounding the first bit error needed to reach the identified bit error is not greater than the search radius, the method further includes not updating the search radius. In another aspect of the above embodiment, the radial search region includes noncontiguous addresses.

In another embodiment, a memory system includes a memory array configured to provide read data in response to read access addresses; error correction and detection logic coupled to the memory array wherein the error correction and detection logic is configured to detect bit errors in read data received from the memory array; and a memory controller coupled to the memory array and the error correction and detection logic, wherein the memory controller comprises radius storage circuitry configured to store a search radius. The memory controller is configured to receive bit error locations from the error correction and detection logic in response to each detected bit error, and in response to each bit error location, provide a set of read access addresses to the memory array for a radial search region around the bit error location defined by the search radius in which the search radius indicates a number of concentric rings of bitcells physically surrounding the bit error location in the memory array. In one aspect, the memory controller includes log storage circuitry configured to store the bit error locations from the error correction and detection logic. In a further aspect, the memory controller is configured to provide the set of read access addresses for the radial search region for each bit error location stored in the log storage circuitry, wherein after providing the set of read access addresses for a bit error, the bit error in the log storage circuitry is marked as scrubbed. In yet a further aspect, the memory controller is configured to iteratively provide sets of read access addresses for radial search regions to the memory array until all bit error locations in the log storage circuitry have been scrubbed. In another aspect, the memory controller is configured to, after all bit error locations in the log storage circuitry have been scrubbed, update a value of the search radius based on a bit distance between an initial bit error location stored in the log storage circuitry and a bit error location which is furthest in location from the initial bit error location.

In yet another embodiment, in a memory having a memory array and error detection and correction logic coupled to the memory array, a method includes reading read data from the memory array; detecting a first bit error in the read data; storing a bit error location of the first bit error in an error log; iteratively scrubbing each bit error location stored in the error log, including the bit error location of the first bit error, until every bit location is scrubbed. Scrubbing each bit error location includes checking for a bit error in all bitcells in a radial search region about the bit error location, wherein the radial search region is defined by a search radius which indicates a number of concentric rings of bitcells physically surrounding the first bit error in the memory array, logging a bit error location for each additional bit error found during the scrubbing, and marking the bit error location as scrubbed. In one aspect, after the iteratively scrubbing each bit error location stored in the error log until every bit location is scrubbed, the method further includes identifying a bit error location of the scrubbed bit error locations in the error log which is furthest in location from the bit error location of the first bit error; determining a number of concentric rings of bitcells physically surrounding the bit error location of the first bit error needed to reach the identified bit error location; and selectively updating the search radius based on the number of concentric rings of bitcells physically surrounding the bit error location of the first bit error needed to reach the identified bit error location. In a further aspect, when the number of concentric rings of bitcells physically surrounding the bit error location of the first bit error needed to reach the identified bit error location is greater than the search radius, the method further includes updating the search radius to indicate the number of concentric rings of bitcells physically surrounding the bit location of the first bit error needed to reach the identified bit error location. In another aspect, the read data includes data bits and error correction bits, wherein the detecting the first bit error in the read data includes using the error correction bits of the read data to detect the first bit error in the data bits of the read data, and wherein the method further includes correcting the bit location of the first bit error.

What is claimed is:

1. In a memory having a memory array, a method comprising:
   reading read data from the memory array;
   detecting a first bit error in the read data; and checking all bitcells in a radial search region about a first bitcell having the first bit error, wherein the radial search region is defined by a search radius which indicates a number of concentric rings of bitcells physically surrounding the first bit error in the memory array, wherein a concentric ring of bitcells includes bitcells at intersections of rows and columns physically adjacent to a bitcell where the first bit error is located, wherein at least one bitcell of the concentric ring of bitcells is located in a different row than a row with the first bitcell.

2. The method of claim 1, wherein the read data includes data bits and error correction bits, wherein the detecting the first bit error in the read data comprises:
using the error correction bits of the read data to detect the first bit error in the data bits of the read data.

3. The method of claim 2, further comprising correcting a bit location of the memory array containing the first bit error.

4. The method of claim 2, wherein the reading the read data from the memory array is performed in response to a read request to the memory, the method further comprising:
after detecting the bit error, correcting the first bit error using the error correction bits prior to returning the read data in response to the read request.

5. The method of claim 1, wherein for each additional bit error detected during the checking all bitcells in the radial search region about the first bit error, the method further comprises:
checking all bitcells for bit errors in a radial search region around the additional bit error defined by the search radius.

6. The method of claim 5, wherein for each additional bit error detected during the checking all bitcells in the radial search region about the error, the method further comprises correcting the additional bit error in the memory array.

7. The method of claim 5, further comprising:
iteratively checking all bitcells in a radial search region around each detected bit error until no additional bit error is detected in the radial search regions.

8. The method of claim 7, wherein after the iteratively checking all bitcells, the method further comprises:
identifying a bit error which is furthest in location from the first bit error;
determining a number of concentric rings of bitcells physically surrounding the first bit error needed to reach the identified bit error; and
selectively updating the search radius based on the number of concentric rings of bitcells physically surrounding the first bit error needed to reach the identified bit error.

9. The method of claim 8, wherein when the number of concentric rings of bitcells physically surrounding the first bit error needed to reach the identified bit error is greater than the search radius, the method further comprises updating the search radius to indicate the number of concentric rings of bitcells physically surrounding the first bit error needed to reach the identified bit error.

10. The method of claim 9, wherein when the number of concentric rings of bitcells physically surrounding the first bit error needed to reach the identified bit error is not greater than the search radius, the method further comprises not updating the search radius.

11. The method of claim 1, wherein the radial search region comprises noncontiguous addresses.

12. A memory system comprising:
a memory array configured to provide read data in response to read access addresses;
error correction and detection logic coupled to the memory array wherein the error correction and detection logic is configured to detect bit errors in read data received from the memory array; and
a memory controller coupled to the memory array and the error correction and detection logic, wherein the memory controller comprises radius storage circuitry configured to store a search radius, wherein the memory controller is configured to:
receive bit error locations from the error correction and detection logic in response to each detected bit error, and
in response to each bit error location, provide a set of read access addresses to the memory array for a radial search region around the bit error location defined by the search radius in which the search radius indicates a number of concentric rings of bitcells physically surrounding the bit error location in the memory array, wherein a concentric ring of bitcells includes bitcells at intersections of rows and columns physically adjacent to a first bitcell where the first bit error is located, wherein at least one bitcell of the concentric ring of bitcells is located in a different row than a row with the first bitcell.

13. The memory system of claim 12, wherein the memory controller comprises log storage circuitry configured to store the bit error locations from the error correction and detection logic.

14. The memory system of claim 13, wherein the memory controller is configured to provide the set of read access addresses for the radial search region for each bit error location stored in the log storage circuitry, wherein after providing the set of read access addresses for a bit error, the bit error in the log storage circuitry is marked as scrubbed.

15. The memory system of claim 14, wherein the memory controller is configured to iteratively provide sets of read access addresses for radial search regions to the memory array until all bit error locations in the log storage circuitry have been scrubbed.

16. The memory system of claim 15, wherein the memory controller is configured to, after all bit error locations in the log storage circuitry have been scrubbed, update a value of the search radius based on a bit distance between an initial bit error location stored in the log storage circuitry and a bit error location which is furthest in location from the initial bit error location.

17. In a memory having a memory array and error detection and correction logic coupled to the memory array, a method comprising:
reading read data from the memory array;
detecting a first bit error in the read data;
storing a bit error location of the first bit error in an error log;
iteratively scrubbing each bit error location stored in the error log, including the bit error location of the first bit error, until every bit location is scrubbed, wherein the scrubbing each bit error location comprises:
checking for a bit error in all bitcells in a radial search region about the bit error location, wherein the radial search region is defined by a search radius which indicates a number of concentric rings of bitcells physically surrounding the first bit error in the memory array, wherein a concentric ring of bitcells includes bitcells at intersections of rows and columns physically adjacent to a first bitcell where the first bit error is located, wherein at least one bitcell of the concentric ring of bitcells is located in a different row than a row with the first bitcell, logging a bit error location for each additional bit error found during the scrubbing, and marking the bit error location as scrubbed.

18. The method of claim 17, wherein after the iteratively scrubbing each bit error location stored in the error log until every bit location is scrubbed, the method further comprises:

identifying a bit error location of the scrubbed bit error locations in the error log which is furthest in location from the bit error location of the first bit error;

determining a number of concentric rings of bitcells physically surrounding the bit error location of the first bit error needed to reach the identified bit error location; and selectively updating the search radius based on the number of concentric rings of bitcells physically surrounding the bit error location of the first bit error needed to reach the identified bit error location.

19. The method of claim 18, wherein when the number of concentric rings of bitcells physically surrounding the bit error location of the first bit error needed to reach the identified bit error location is greater than the search radius, the method further comprises updating the search radius to indicate the number of concentric rings of bitcells physically surrounding the bit location of the first bit error needed to reach the identified bit error location.

20. The method of claim 17, wherein the read data includes data bits and error correction bits, wherein the detecting the first bit error in the read data comprises:

using the error correction bits of the read data to detect the first bit error in the data bits of the read data, and wherein the method further comprises correcting the bit location of the first bit error.

\* \* \* \* \*